United States Patent

Ichikawa et al.

[11] Patent Number: 5,716,578
[45] Date of Patent: Feb. 10, 1998

[54] METHOD FOR MOLDING A RETAINER FOR SEAT

[75] Inventors: Kouji Ichikawa; Seiichi Yuda, both of Yokohama, Japan

[73] Assignee: Nifco Inc., Japan

[21] Appl. No.: 576,344

[22] Filed: Dec. 21, 1995

Related U.S. Application Data

[62] Division of Ser. No. 380,000, Jan. 27, 1995, Pat. No. 5,649,783.

[30] Foreign Application Priority Data

Jul. 26, 1994 [JP] Japan ............... 6-174429

[51] Int. Cl.[6] ............... B29C 33/44; B29C 39/04; B29C 39/34; B29D 22/00
[52] U.S. Cl. ............... 264/318
[58] Field of Search ............... 264/318

[56] References Cited

U.S. PATENT DOCUMENTS

| | | | |
|---|---|---|---|
| Re. 19,000 | 5/1933 | Scribner | 264/318 |
| 4,399,092 | 8/1983 | Snow, Sr. et al. | 264/318 |
| 4,865,505 | 9/1989 | Okada | 411/512 |
| 5,193,961 | 3/1993 | Hoyle et al. | 411/553 |
| 5,490,966 | 2/1996 | Higgins | 24/289 |

FOREIGN PATENT DOCUMENTS 5-23398   6/1993   Japan.

*Primary Examiner*—Jan H. Silbaugh
*Assistant Examiner*—Edmund H. Lee
*Attorney, Agent, or Firm*—Parkhurst, Wendel & Burr, L.L.P.

[57] ABSTRACT

A retainer for a seat that can be molded by a pair of metal molds and which prevents water from entering into a portion which locks a hook member. The retainer for a seat comprises: a box-shaped leg body with an opening being inserted through a mounting hole; a flange extending outwardly from a vicinity of the opening; pawl portions protruding from outer surfaces of the leg body, and the peripheral edge of the mounting hole is held between the pawl portions and the flange; and retaining bodies protruding from the inner surfaces of the leg body in the direction of approaching each other, and resiliently retaining a hook member which is inserted through the opening.

1 Claim, 11 Drawing Sheets

METHOD FOR MOLDING A RETAINER FOR SEAT

This is a Division of application Ser. No. 08/380,000 filed Jan. 27, 1995, now U.S. Pat. No. 5,649,783.

BACKGROUND OF THE INVENTION

1. Field of the Invention

The present invention relates to a retainer for a seat which is mounted to an underpanel of a vehicle and which retains a seat wire provided at a bottom surface of a rear seat so as to mount the rear seat to the vehicle.

2. Description of the Related Art

As shown in FIG. 13, when the rear seat is mounted to the vehicle, a retainer 50 for a seat is usually fit into a mounting hole 20, which is punched at an underpanel 44 at the rear side of the vehicle. The retainer 50 for seat engages a seat wire 36, which serves as a U-shaped hook member and is provided at the underside of the rear seat.

However, in the conventional retainer 50 for seat, a lock member 52 which engages the seat wire 36 and a leg body 54 which is fit into the mounting hole 20 are separately molded.

Accordingly, two pairs of metal molds were needed and two parts had to be assembled. Therefore, it was difficult to reduce the operating hours. Further, since it was impossible to guarantee that the structure would be completely sealed at a portion which engages an engaging hole 56, which is formed on the side wall of the leg body 54, and a pawl portion 58, which protrudes from the side wall of the lock portion 52, water may enter into a portion which locks the seat wire 36.

Moreover, when the seat wire 36 was pulled hard, there was a drawback in that the lock member 52, which retains the seat wire 36 at a retaining portion 60, was also taken out from the leg body 54.

Therefore, a retainer 62 for seat shown in FIG. 14 has also been proposed.

The retainer 62 for seat can be molded by one type of metal mold, and both parts of the retainer 62 are connected by a thin hinge 64 so that an inner metal mold can be taken out from the retainer 62. Accordingly, the retainer 62 is easily assembled.

However, sealability of joined surfaces 66 was unreliable and water may enter into pawl portions 68, which engage the seat wire 36 (see FIG. 13). In addition, the hinge 64 can be broken.

SUMMARY OF THE INVENTION

With the aforementioned in view, an object of the present invention is to provide a retainer for a seat which can be molded by a pair of metal molds and which prevents water from entering into a portion which locks a hook portion.

The retainer for a seat relating to the present invention comprises a box-shaped leg body with an opening only at the upper portion thereof, and which is inserted through a mounting hole; a flange which extends outwardly from a vicinity of the opening; pawl portions which protrude from outer surfaces of the leg body, and a peripheral edge of the mounting hole Is held between the pawl portions and the flange; and retaining bodies which protrude from inner surfaces of the leg body in the direction of approaching each other, the retaining bodies resiliently retain a hook member which is inserted through the opening.

In the aforementioned retainer for seat, it is preferable that the retaining bodies are formed such that side surfaces of the leg body are caved in.

Further, in the aforementioned retainer for seat, it is preferable that the leg body has presser boards for holding the hook member from both sides.

Moreover, in the aforementioned retainer for seat, in a state in which an outer metal mold for molding the outer surfaces of the leg body is opened, the height of the protrusion of the retaining body with respect to the inner surfaces of the leg body can be adjusted such that an inner metal mold which molds the inner surfaces of the leg body can be drawn out of the retainer.

In the retainer for seat relating to the aforementioned present invention, the leg body is inserted through the mounting hole and the peripheral edge of the mounting hole is supported between the pawl portions and the flange. Here, since the opening is provided only at the upper side of the leg portion, water does not enter into the leg portion from the lower side thereof.

The retaining bodies are formed at the inner surfaces of the leg body. When the rear seat is disposed on the underpanel having the mounting hole, the hook member, which protrudes from the bottom surface of the rear seat, is inserted through the opening of the leg body and abuts the retaining bodies which are then elastically deformed. When the hook member is further inserted, the retaining bodies elastically return to their original form and retain the hook member.

Further, according to another retainer for seat relating to the present invention, the retaining bodies are formed so that the side surfaces of the leg body are caved in. In other words, the retaining bodies are formed so as to be thin. As a result, the retaining bodies are easily elastically deformed outwardly and the inserting force of the hook member becomes small.

According to still another retainer for seat relating to the present invention, the presser boards are provided within the leg body. The presser boards support the hook member retained at the retaining bodies from both sides so as to prevent the hook member from rattling.

According to a still further retainer for seat relating to the present invention, in a state in which the outer metal mold which forms the outer surfaces of the leg body is opened, the protruding height of the retaining body can be adjusted with respect to the inner surface of the leg body so that the inner metal mold which forms the inner surfaces of the leg body can be removed from the retainer for seat while the leg body is bent outwardly.

Consequently, the retainer for seat, which is molded by one type of the metal mold and is formed by one part, can be formed.

Because the present invention Is structured as described above, the retainer for seat can be molded by a pair of metal molds and water does not enter into the portion which locks the hook member. Further, the inserting force of the hook member can be made small.

DESCRIPTION OF THE PREFERRED EMBODIMENTS

Figure 1:
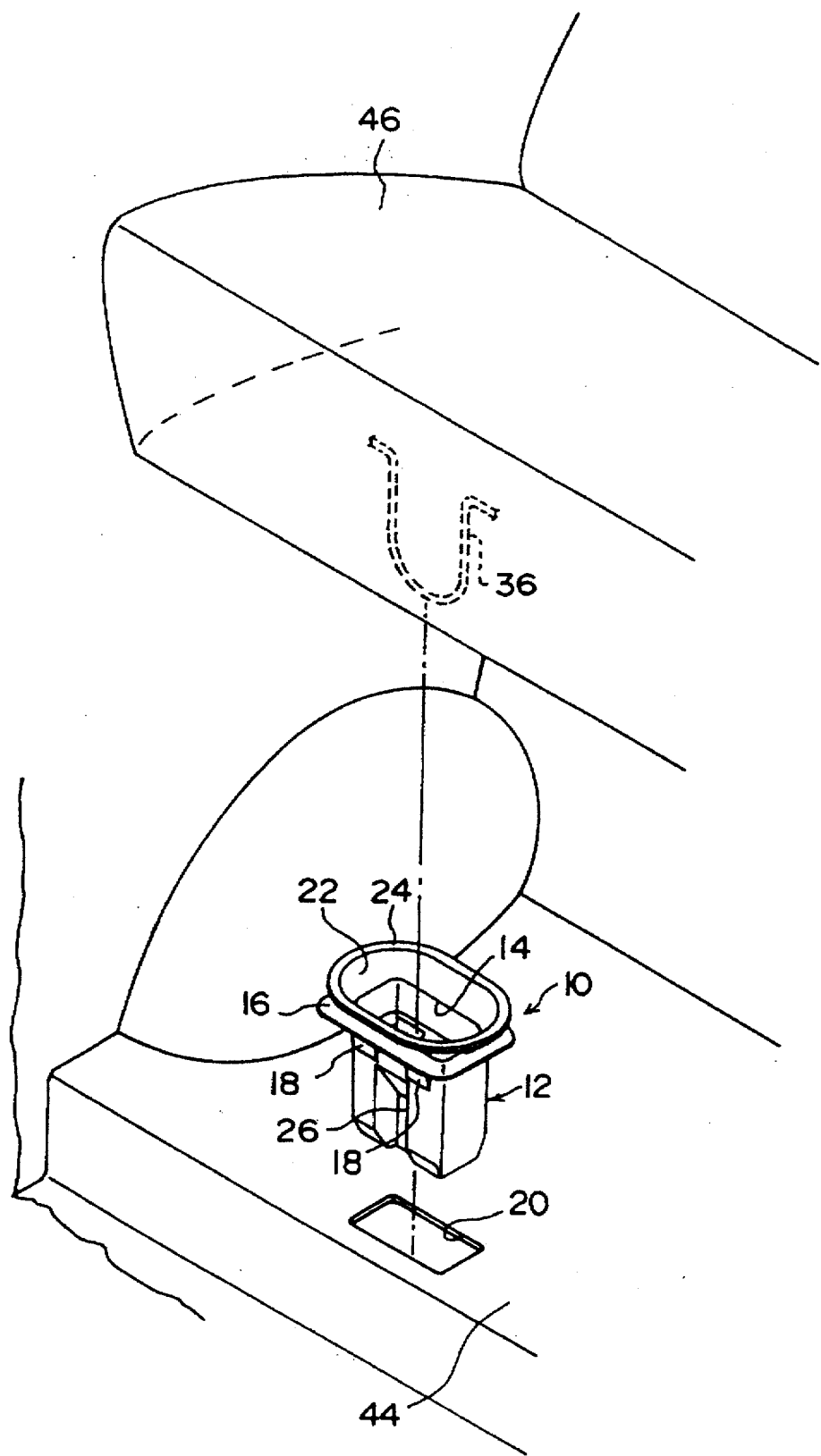
FIG. 1 is a perspective view which shows a relationship between a retainer for seat relating to a present embodiment and a seat.
Figure 2:
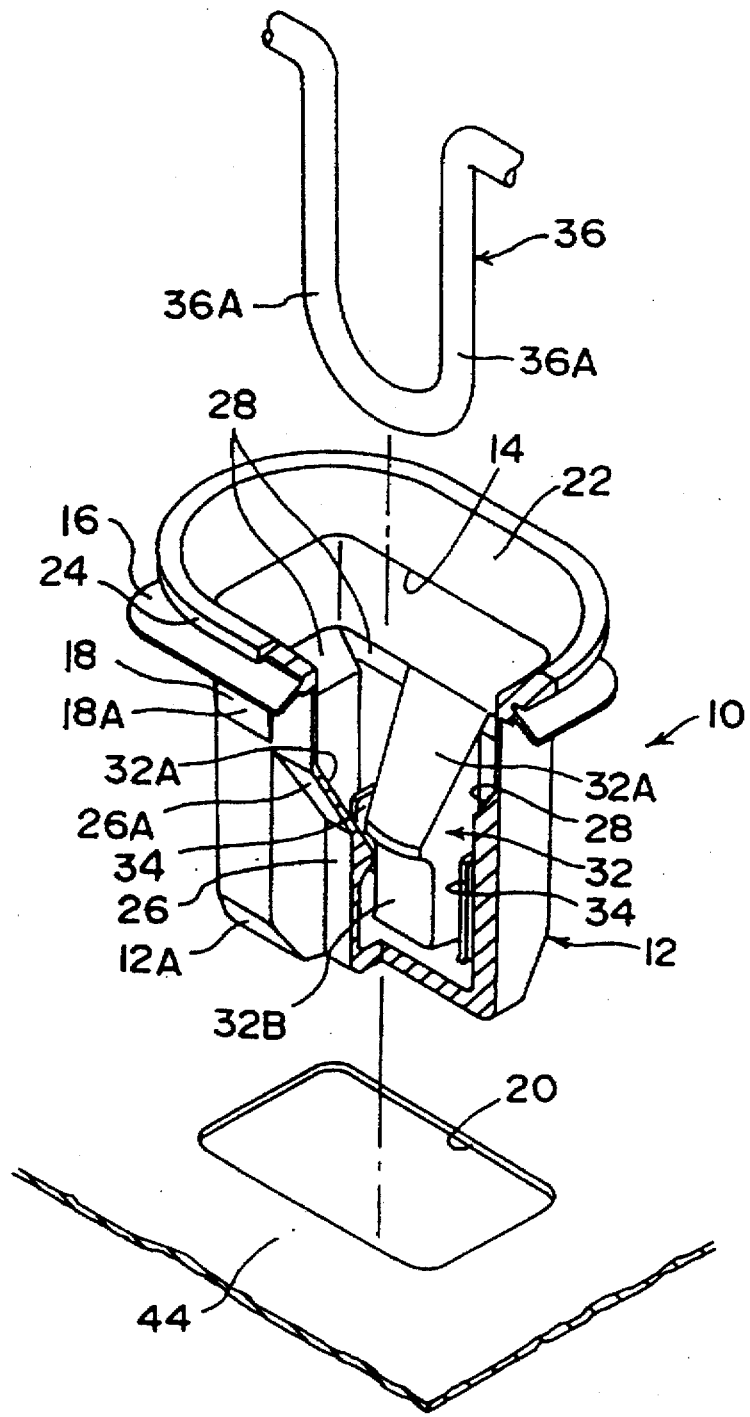
FIG. 2 is a perspective view which shows a relationship between the retainer for seat relating to the present embodiment and a seat wire before the retainer is inserted through a mounting hole.
Figure 3:
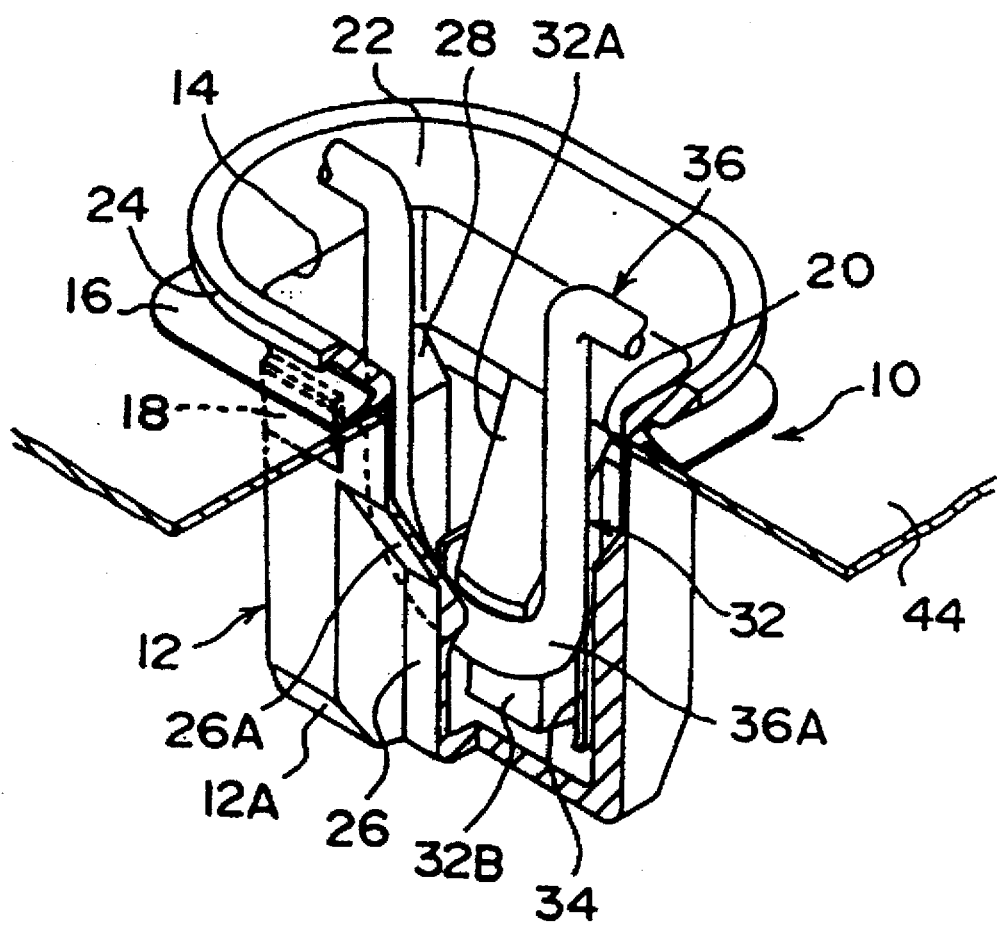
FIG. 3 is a perspective view which shows the state in which the retainer for seat relating to the present embodiment is inserted through the mounting hole and retains the seat wire.

As illustrated in FIGS. 1 through 3, a retainer 10 for seat relating to the present embodiment includes a box-shaped leg body 12.

Figure 7:
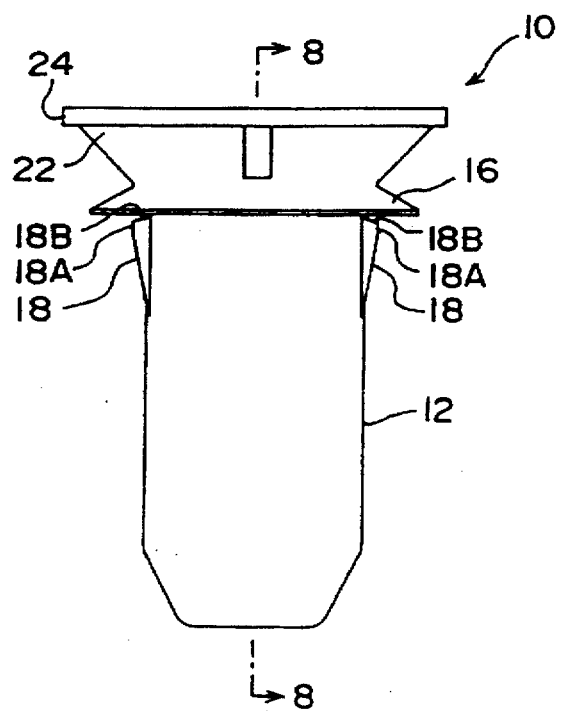
FIG. 7 is a side view of the retainer for seat relating to the present embodiment.
Figure 8:
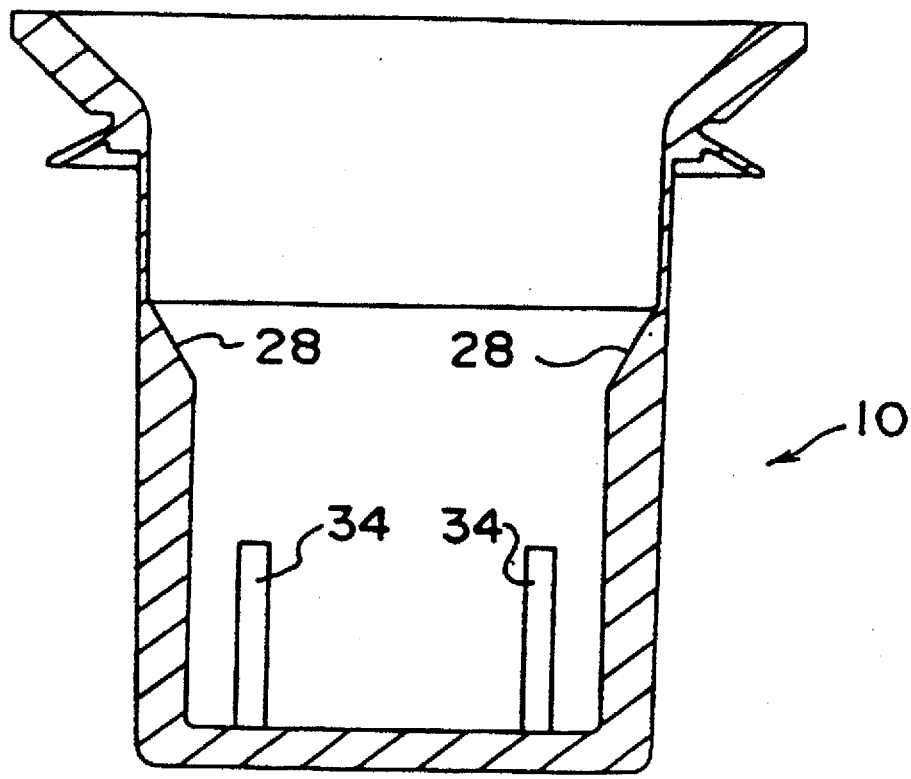
FIG. 8 is a cross sectional view taken along line 8—8 of FIG. 7.

A thin flange 16 extends outwardly at a peripheral edge portion of an opening 14 of the leg body 12. In addition, on the side surfaces of the leg body 12, a pair of pawl portions 18 are formed at transverse direction ends of the leg body 12. As shown in FIG. 7, the pawl portion 18 is provided with an inclined surface 18A and the thickness thereof increases toward the flange 16. The end portion of the inclined surface 18A is cut out so as to form a upright surface 18B. The peripheral edge of the mounting hole 20 is held between the upright surface 18B and the flange 16.

Moreover, above the flange 16 is formed a guide plate 22, which inclines upwardly and widens in the shape of a funnel from the peripheral edge portion of the opening 14. An edge portion 24 is formed at the outer periphery of the tip end of the guide plate 22 so as to be elliptic when viewed from upside. A floor carpet 70 is held between the edge portion 24 and the flange 16.

Figure 10:
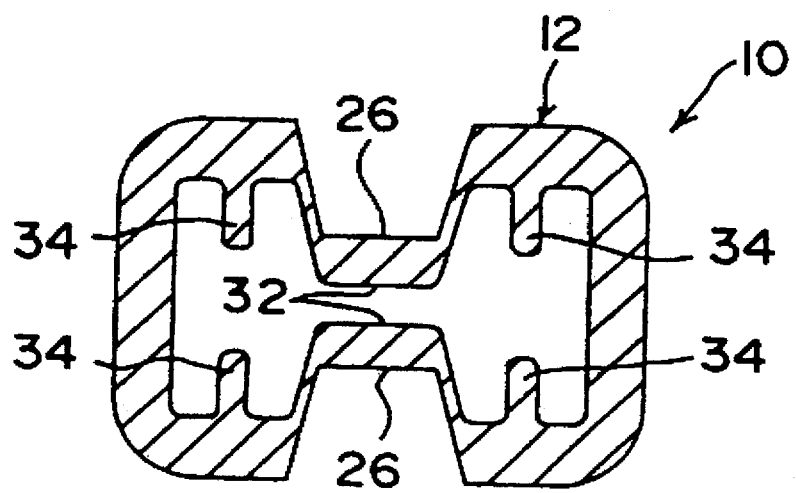
FIG. 10 is a cross sectional view taken along line 10—10 of FIG. 6.
Figure 11:
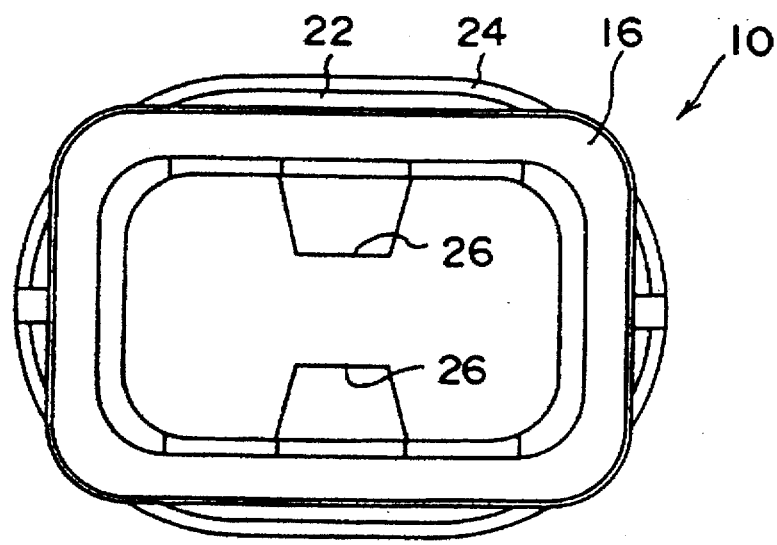
FIG. 11 is a bottom view of the retainer for seat relating to the present embodiment.
Figure 12:
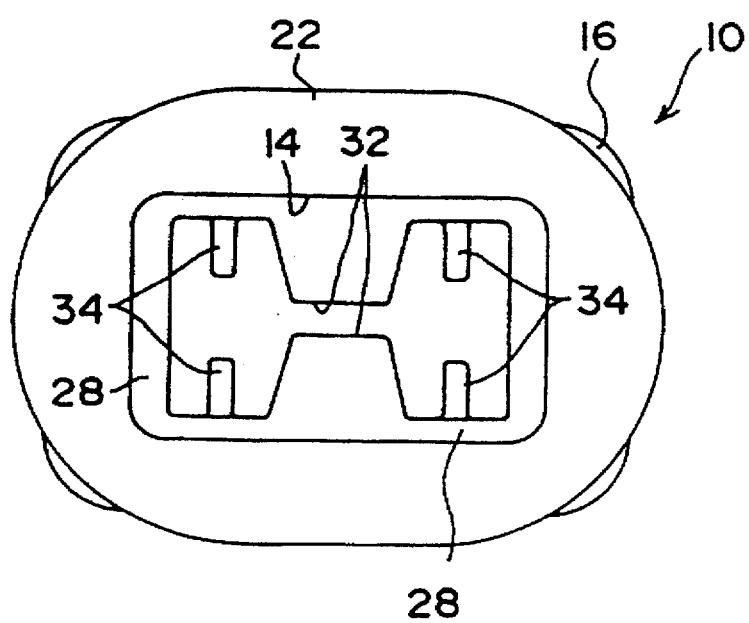
FIG. 12 is a plan view of the retainer for seat relating to the present embodiment.
Figure 13:
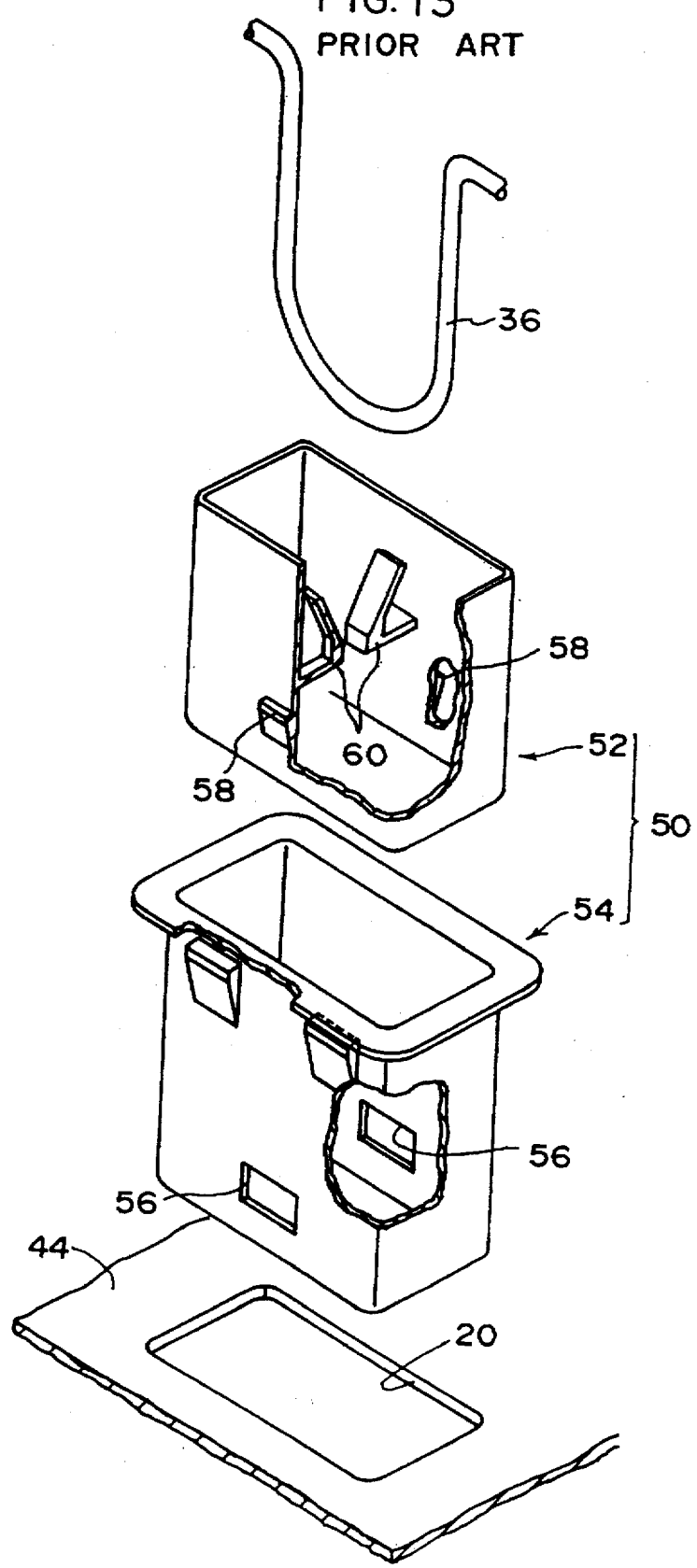
FIG. 13 is an exploded perspective view, in which a portion of a conventional retainer for seat is cut.
Figure 14:
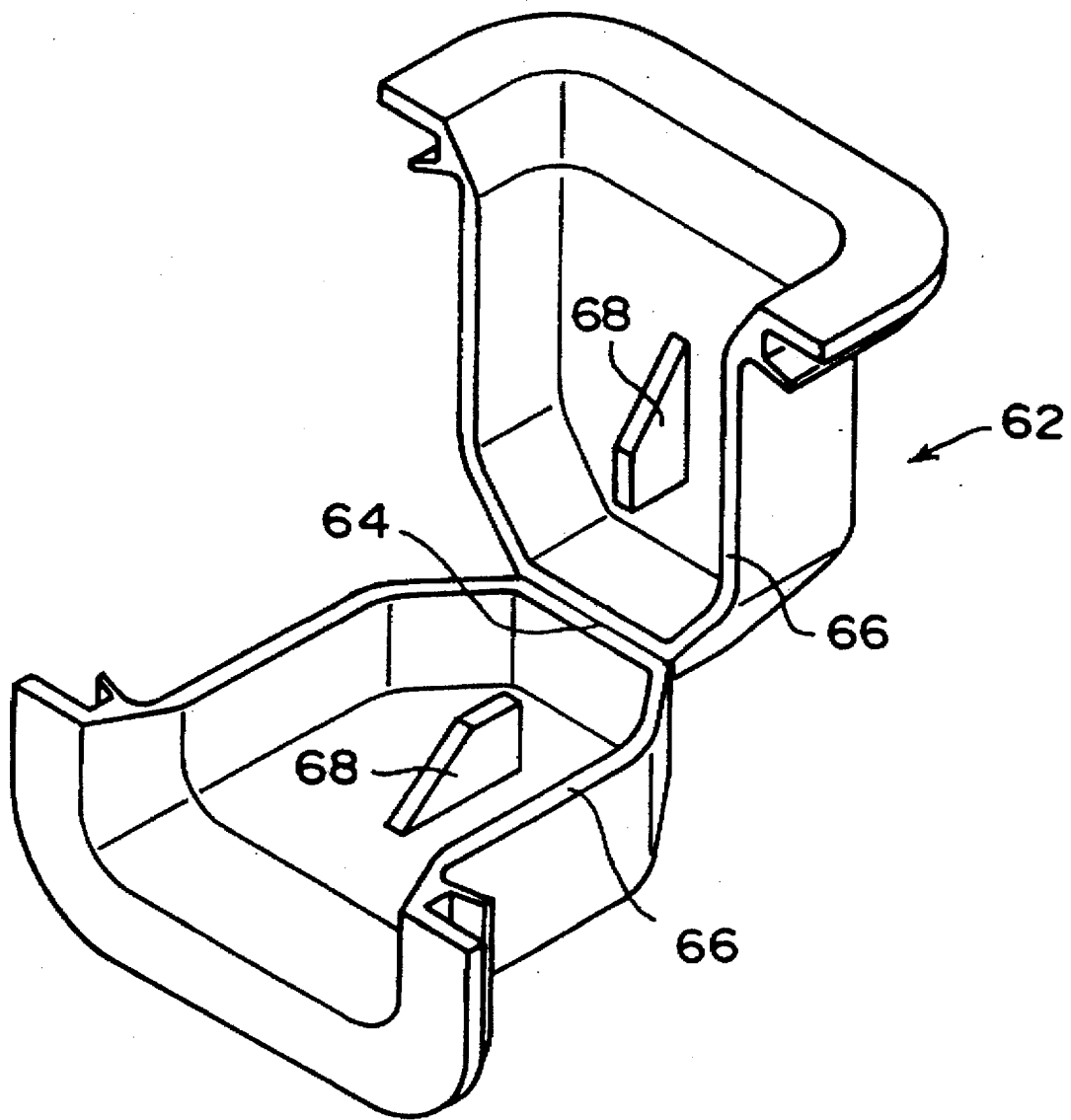
FIG. 14 is an unfolded perspective view which shows a conventional retainer for seat.

As illustrated in FIGS. 2 and 10, toward the bottom portion of the leg body 12, both sides are inclined inwardly so that the central portion of the bottom portion of the leg body 12 is narrow. While maintaining this width, a concave portion 26 which extends to the flange 16 side is formed at the respective side surfaces of the leg body 12. A tapered surface 26A is formed at the concave portion 26 on the flange 16 side thereof. The tapered surface 26A and the side surface of leg body 12 form one surface in the vicinity of the starting ends of the pawl portions 18. A tapered portion 12A is formed in a vicinity of the bottom surface of the leg body 12 so that the tip end thereof is narrow. Consequently, it is easy to insert the leg body 12 through the mounting hole 20.

On the other hand, the inner surfaces of the leg body 12 are straight from the opening 14 to a predetermined position. Thereafter, four sides of the leg body 12 are inclined inwardly to form a tapered surface 28 so that the volume thereof is reduced. The retaining body 32 includes a tapered surface 32A which is continuous with the tapered surfaces 28 at the same inclination. The retaining bodies 32 protrude in the direction of approaching each other. A gap between the retaining bodies 32 is set smaller than the diameter of the seat wire 36.

The tapered surface 32A of the retaining body 32 and the tapered surface 26A of the concave portion 26 are integrally formed. In other words, the retaining body 32 is formed so as to be thin and is flexible.

The retaining body 32 is recessed from the ends of the tapered surfaces 32A to the bottom surface of the leg body 12 in the direction that the inner surfaces thereof are gradually apart from each other to form the retaining portions 32B to retain the U-shaped seat wire 36. On the bottom surface of the leg body 12, a pair of opposing presser boards 34 are provided at both sides of the retaining body 32. The presser boards 34 hold the curved portion 36A of the seat wire 36, which is retained by the retaining portions 32B, from both sides.

Next, the method of molding the retainer 10 for seat relating to the present embodiment will be explained.

Figure 4:
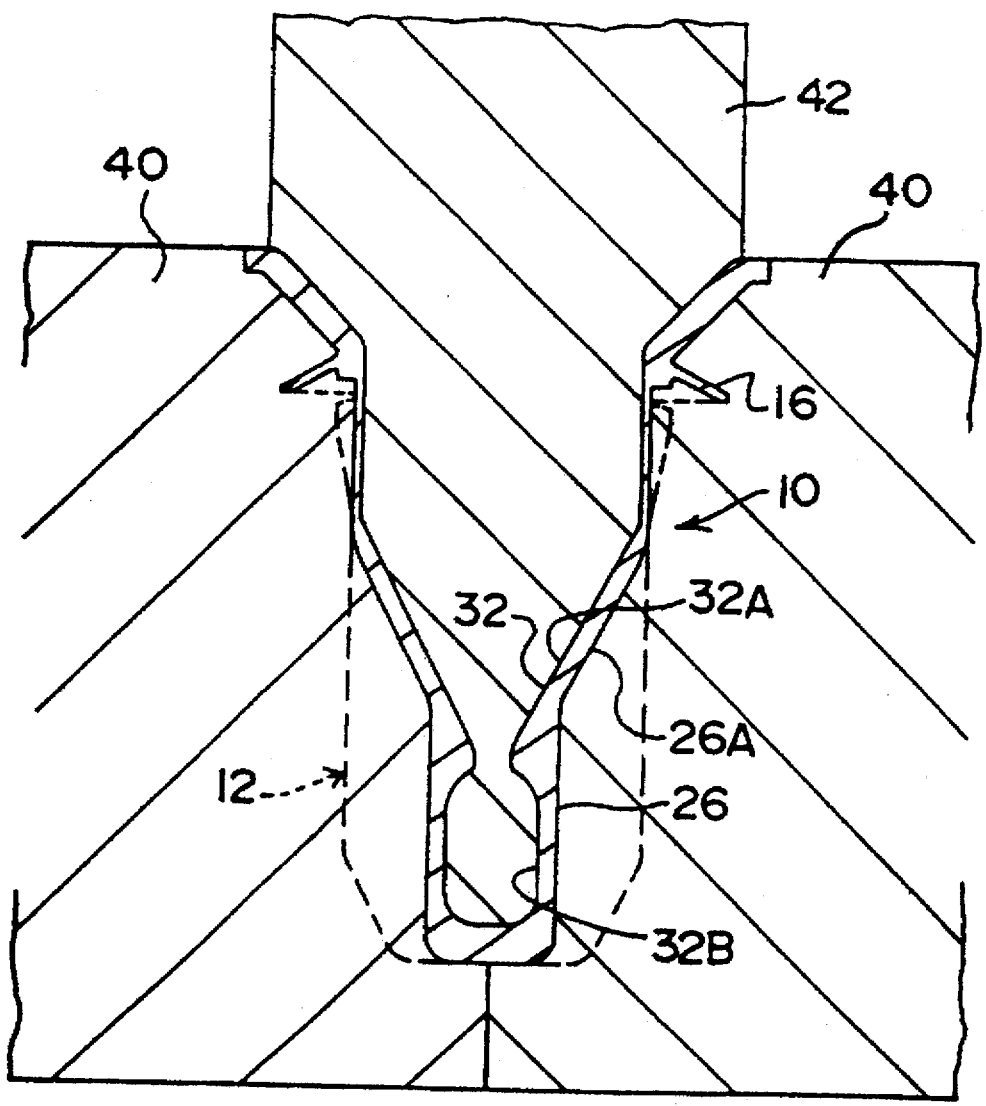
FIG. 4 is a cross sectional view showing a metal mold which molds the retainer for seat relating to the present embodiment.

As illustrated in FIG. 4, an outer metal mold 40 which molds outer surfaces of the retainer 10 for seat and an inner metal mold 42 which molds inner surfaces of the retainer 10 for seat are joined together and then resin is filled between the outer metal mold 40 and the inner metal mold 42. When the resin is cured, the outer metal mold 40 is opened at first and allows the retainer 10 for seat to bend outwardly.

Figure 5:
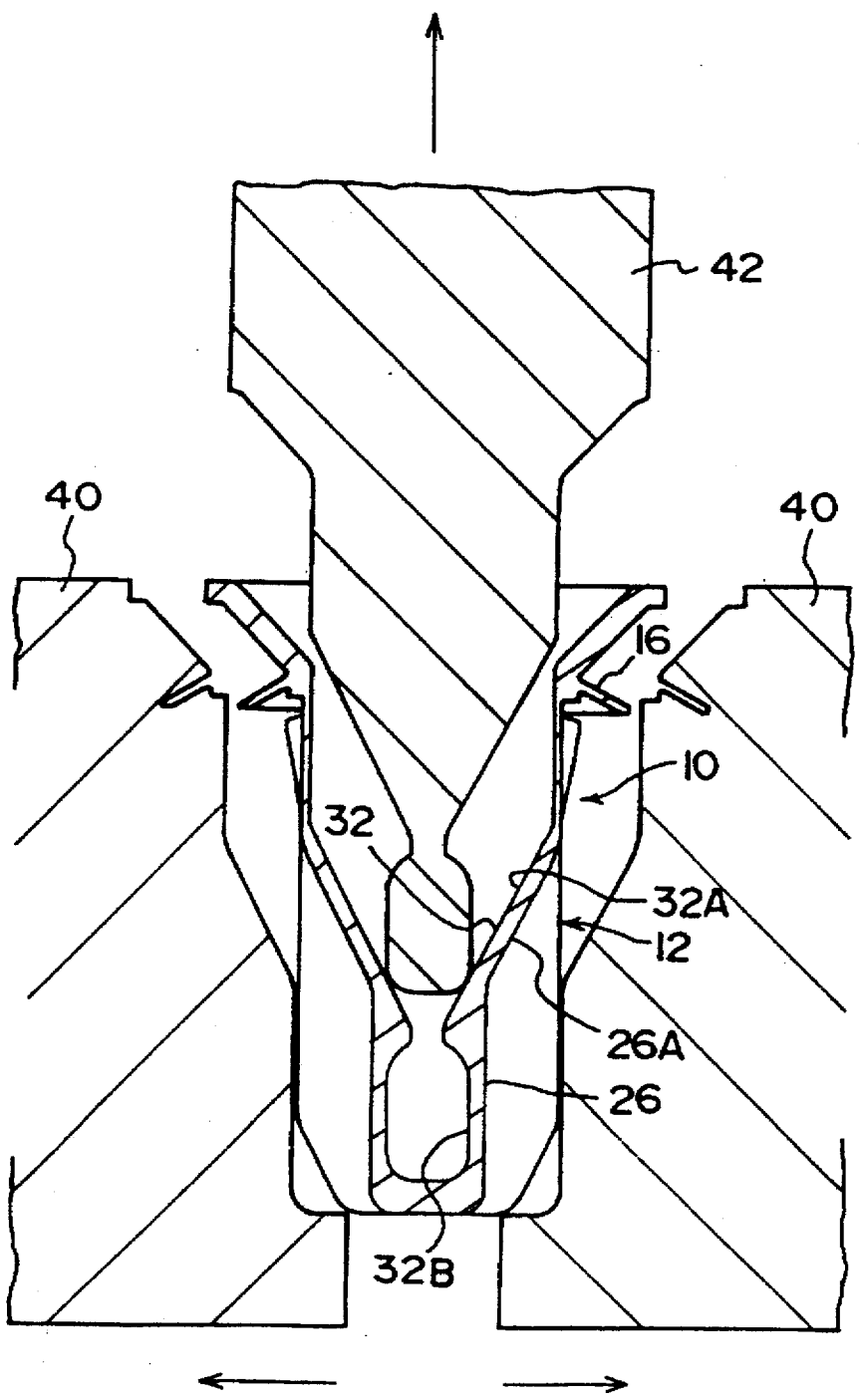
FIG. 5 is a cross sectional view showing a state in which the metal mold which molds the retainer for seat relating to the present embodiment is partially opened.
Figure 6:
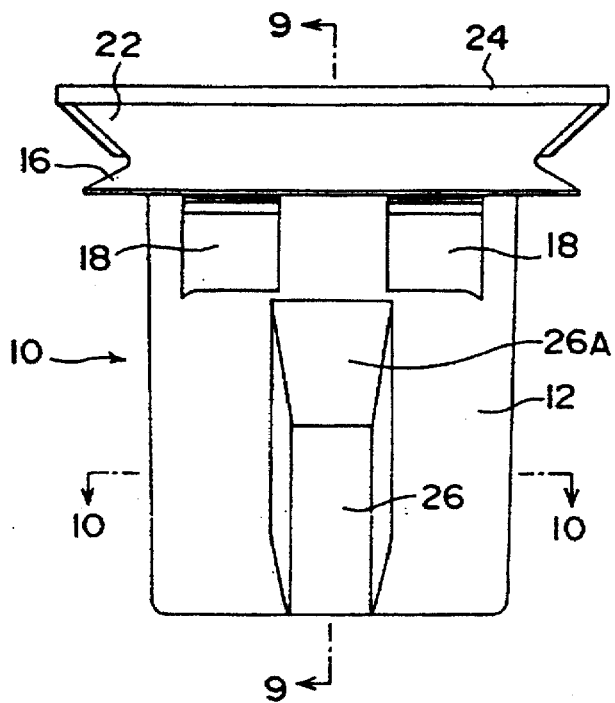
FIG. 6 is a front view of the retainer for seat relating to the present embodiment.

Then, as shown in FIG. 5, the inner metal mold 42 is drawn out of the retainer 10 while the leg body 12 is bent outwardly (a so-called forced removal) to form the retainer 10 for seat.

In order to enable the forced removal, the height of protrusion at the very tip end of the tapered surface 32A is adjusted with respect to the tapered surface 32B. Accordingly, the retainer 10 for seat can be molded by a pair of metal molds. Further, since the box-shaped leg body 12 is integrally formed as one piece, the retainer 10 for seat has excellent sealability and water does not enter into the leg body 12 from outside.

Next, the operation of the retainer 10 for seat relating to the present embodiment will be explained.

Figure 9:
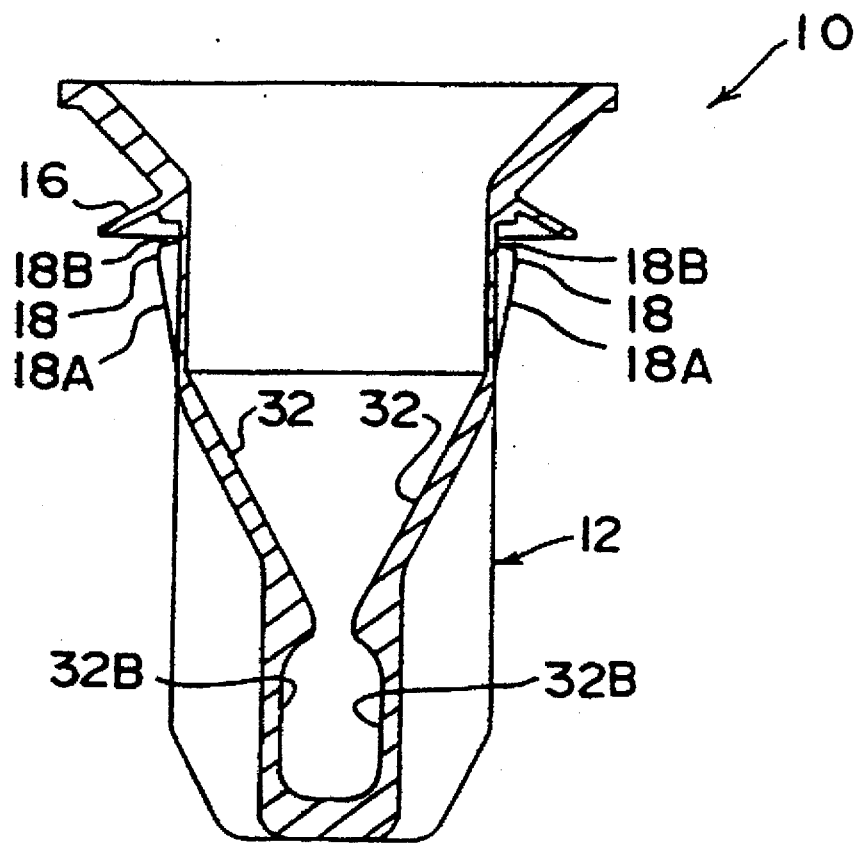
FIG. 9 is a cross sectional view taken along line 9—9 of FIG. 6.

As illustrated in FIG. 3, when the leg body 12 of the retainer 10 for seat is inserted through the mounting hole 20, the pawls 18 are elastically deformed toward the inner side of the leg body 12 while the tapered surfaces 18A slide against the peripheral edge of the mounting hole 20. As shown in FIG. 9, the inner surface of the leg body 12 with the pawls 18 thereon is made wide and the leg body is formed so as to be thin, which causes the leg body 12 to be flexible.

Then, when the tapered surfaces 18A pass through the edge portion of the mounting hole 20, the pawl portions 18 elastically return to the original forms and the edge portion of the mounting hole 20 is held between the upright surfaces 18B and the flange 16.

Accordingly, the retainer 10 for seat mounted to an underpanel 44 penetrates through a long hole formed on unillustrated carpet so that the carpet is held between the flange 16 and the guide plate 22.

Here, when a rear seat 46 is disposed on the underpanel 44, the seat wire 36 provided at the underside of the rear seat 46 is guided by the guide plate 22 and inserted through the opening 14. Then, the seat wire 36 is guided by the tapered surfaces 28 and 32A and reaches the retaining portions 32B while pressing and expanding the retaining body 32. Because the retaining body 32 is formed so as to be thin and is flexible, the inserting force for the seat wire 36 is small. Further, in the state in which the seat wire 36 is retained by the retaining portions 32B, the curved portion 36A of the seat wire 36 is pressed by the presser boards 34 which are disposed at both sides of the retaining body 32. Accordingly, the seat wire 36 does not rattle therewithin.

What is claimed is:

1. A method of forming a retainer for a seat comprising:

a box-shaped leg body with an opening, said leg body having a longitudinal direction and a bottom surface and peripheral side walls integrally formed on said bottom surface and having substantially planar opposing side surfaces and being inserted through a mounting hole of a base;

a flange outwardly extending from the vicinity of said opening:

pawl portions protruding from outer surfaces of said leg body, a peripheral edge of said mounting hole being held between said pawl portions and said flange;

retaining bodies protruding from opposing inner surfaces of said leg body in a direction so that the retaining bodies approach each other, said retaining bodies capable of resiliently retaining a hook member that is inserted through said opening; and said retainer for a seat capable of receiving a plurality of elongate presser boards, the length being provided in the longitudinal direction of said leg body for holding said hook member from both sides in said leg body, each said presser board including a portion protruding from one of said opposing inner surfaces of said leg body and being spaced laterally from a said retaining body on said one of said opposing inner surfaces, said method comprising the steps of:

joining an outer metal mold for molding outer surfaces of said retainer for a seat and an inner metal mold for molding inner surfaces of said retainer for a seat;

filling resin between said outer metal mold and said inner metal mold;

curing said resin and removing said outer metal mold so that said retainer for a seat can bend outwardly; and drawing said inner metal mold out of said retainer for a seat while said leg body is bent outwardly.

* * * * *